Patented Nov. 25, 1947

2,431,347

UNITED STATES PATENT OFFICE 2,431,347

STABILIZING GLYCERIDE OILS

Albert Scharf, New York, N. Y., assignor to American Lecithin Company, Cleveland, Ohio, a corporation of Ohio No Drawing. Application January 5, 1943, Serial No. 471,367

2 Claims. (Cl. 260—398.5)

This invention relates to fatty oils, such as cottonseed oil, soybean oil, lard and vegetable and animal oils or fats generally and particularly to such oils in which the onset of rancidity is prolonged.

This application is a continuation-in-part of application Serial No. 292,837, dated August 31, 1939.

As ordinarily prepared and used these fatty oils are subject to deterioration. Thus, exposure to air or oxygen results in oxidation. Disagreeable odor and taste, referred to as "rancidity" often develop. Both physical and chemical changes in the nature of the fat may take place. It is known that hydrogenation improves fatty oils for some purposes but hydrogenated oils or shortenings are still subject to deterioration.

An object of this invention is to improve the stability or keeping qualities of fatty oils (triglycerides).

Another object is to improve the quality and shelf life of foods made with oils or fats, such as salad dressings and baked goods.

A further object is to improve the durability or resistance to rancidity of oils or shortenings used for "deep frying" and to enhance the keeping properties of the "deep fried" food.

A still further object is the production of fatty oil products, of either vegetable or animal origin, possessing increased resistance to deterioration.

Other objects will appear from time to time hereafter.

Oxidation of fatty oils and subsequent rancidity are usually associated. According to one theory, the oxidation of fatty oils is a chain reaction. The peroxide substances produced in the initial stage induce further breakdown so that the rancidity is accelerated. But if the peroxide is removed by reaction with another substance, an "anti-oxidant," the chain reaction is broken off. When the anti-oxidant has been consumed the chain reaction begins again accompanied by the increase in peroxide value. Thus, peroxide values may be used as a test for the reaction. The peroxide method in various modifications is used in many industrial laboratories to check and control oils and fats with reference to stability. Usually a higher temperature is used to accelerate the development of rancidity in such experiments. The results of these tests are in general agreement with long time storage experiments at atmospheric temperatures, which however take too much time to be of practical value in industrial control.

I have discovered a method of using commercial soybean lecithin and the separated alcohol insoluble phosphatide (cephalin fraction) whereby the stability or keeping properties of fatty oils can be greatly improved. Furthermore, I have overcome some of the deficiencies of phosphatides as antioxidants as heretofore used. In the past it has been customary to add the soybean lecithin or phosphatides to the cold oil or shortening or to the fat at a temperature at about or under 130° F. This necessitated an extra operation in the preparation of the premixture of oil with phosphatide to assure uniform incorporation and even then the oil became hazy. When the oil or shortening containing lecithin or phosphatide added in this manner was subjected to deep frying temperatures ranging from 300° F. to 410° F., the oil became objectionably dark during such use and it was assumed that the effectiveness of the lecithin had been destroyed.

It is not necessary to employ only commercial soybean lecithin or soybean phosphatide. My invention can be practiced with phosphatides or lecithin with either animal or vegetable origin, such as phosphatides from milk, of packing house origin, from eggs or from corn oil or cottonseed oil or other vegetable oils or their respective oil bearing seeds. Usually vegetable phosphatides are preferable because more readily obtainable in commercial quantities. In practicing my invention I find the alcohol insoluble phosphatides especially effective and I believe the efficient factor is cephalin or an associated substance.

As a rule the fatty oils to which my process is applied have first been more or less refined for use in food: however, some like lard may not have been refined, bleached or deodorized. Also my process can be applied to fatty oils which are to be used for industrial purposes, such as in the textile industry or for surface coatings, and in general wherever fatty oils of superior keeping quality are desired.

According to my process, the fatty oil or shortening is first heated to a temperature preferably between 350° and 410° F. The temperature range is critical, because no effect is seen at temperatures, for instance, of about 300° F. and below. The fat may then be allowed to cool partially and the phosphatide is incorporated. It is possible to add the phosphatide to the fat or oil before heating to the elevated temperature or at the elevated temperature but while the keeping properties of the fatty oil are also greatly improved, the color and odor of the fatty oil are less satisfactory. On the other hand, the fatty oils may be heated, then allowed to cool to room temperature before addition of the phosphatide but this does not give as marked an improvement and if a considerable period elapses before the phosphatide is added, the effect is not obtained. Simple heating of the fatty oils to an elevated temperature between 350 to 400° F. brings about only a slight and insignificant improvement. Heating much over 410° F. damages the fatty oils irreparably for food purposes.

Unless otherwise stated the comparative stability tests referred to below were run at 60° C.

EXAMPLE 1

50 grams of cottonseed salad oil were heated to 410° F. and when the oil was cooled down to 300° F., 0.1% of commercial soybean lecithin was added. At the end of the third day of accelerated testing, the control cottonseed oil, also heated to 410° F. showed an increase in peroxide value to 15.93 whereas the oil containing 0.1 percent of soybean lecithin had a peroxide value of 3.27.

EXAMPLE 2

50 grams of cottonseed oil, the same as used in Example 1, were heated to 410° F. and when the oil was cooled down to 300° F., 0.1% percent of alcohol insoluble phosphatides, prepared from soybeans was added. At the end of the third day the treated oil had a peroxide value of 2.81. The experiment was repeated with cephalin from spinal cord and similar results obtained.

EXAMPLE 3

To another sample of cottonseed oil 0.1 percent of alcohol insoluble phosphatides were added and the oil heated to 400° F. and allowed to cool to room temperature. At the end of seven days testing the treated oil had a peroxide value of 1.7 compared to 5.1 for the same oil untreated.

EXAMPLE 4

A sample of pure lard was rendered at 200° C. with 0.1 percent of alcohol insoluble phosphatides prepared in the following manner: 350 grams of commercial soybean lecithin were dissolved in petroleum ether, filtered and a large part of the ether removed by evaporation. The mass was then extracted twice with acetone, and the residue or precipitate twice extracted with cold alcohol. The insoluble matter was once more dissolved in petroleum ether and the solvent then evaporated and the substance slowly dried.

The lard rendered with the alcohol insoluble phosphatides gave, under test conditions, on the eighth day a peroxide value of 2.99 whereas the same lard without the phosphatide gave a peroxide value of 8.72 on the eighth day.

The experiment was repeated at a rendering temperature of 150° C. but the results were much less satisfactory.

EXAMPLE 5

To 50 grams of refined cottonseed oil were added 0.2% of alcohol insoluble phosphatides and the mixture heated to 350° F. and allowed to cool. At the end of thirteen days of testing the treated oil showed a peroxide value of 29.35 compared to 57.04 for the control.

EXAMPLE 6

A sample of refined cottonseed oil was heated to 410° F., allowed to cool to 300° F. and 0.1% of soybean phosphatide added and the oil then reheated to 410° F. Not only was the stability of the oil improved by this procedure but it was surprising to note that while somewhat darker in color than the treated oil prepared according to sample 1, nevertheless the oil was not as dark as where the phosphatide is added at the time of the first heating to 410° F. Thus, oil treated according to the present invention not only keeps better and has a better color, but when heated to high temperature during use darkens materially less than untreated oil.

EXAMPLE 7

50 grams soybean oil were heated to 400° F. and when cooled down to 300° F., 0.1 percent soybean lecithin was added. Immediately after adding the phosphatide the treated oil had a peroxide value of 0.39 compared to 3.8 for the untreated oil. After three days when kept at 60° C. the treated oil had a peroxide value of 3.74 compared with 31.85 for the untreated oil.

EXAMPLE 8

50 grams shortening were heated to 410° F. and after cooling down to 300° F. 0.05 percent of lecithin was added. After six days the peroxide value was 3.40 compared to 12.80 for the untreated shortening from the same sample.

EXAMPLE 9

50 grams of cottonseed oil were heated to 400° F. and after cooling to 300° F. 0.05 percent commercial corn oil phosphatide was added. After three days the treated oil had a peroxide value of 2 compared to 12 for the untreated oil.

EXAMPLE 10

A sample of cottonseed oil was divided into four parts and tested as follows:

I. A control of unheated oil.
II. A control of oil heated to 400° F. without the addition of any phosphatide.
III. A control of oil to which was added 0.1% of soybean lecithin without heating.
IV. Oil was heated to 400° F. and 0.1% soybean lecithin was added at a temperature of about 300° F. immediately after heating.

Peroxide values of each sample were taken when the experiments were commenced. The samples were then allowed to stand at room temperature for four weeks when the peroxide values were determined again. The samples were then put into the oven and kept at 65° C. and the peroxide values taken after 44 hours and again after 64 hours. The results are shown in the table:

Table

| Experiment | Peroxide Values | | | |
|---|---|---|---|---|
| | Original | 4 weeks at room temperature | After 44 hours at 65° C. | After 64 hours at 65° C. |
| I | 1.8 | 3.5 | 6.3 | 7.3 |
| II | 0.5 | 1.9 | 4.4 | 5.3 |
| III | 1.8 | 2.4 | 4.2 | 5.0 |
| IV | 0.5 | 1.2 | 2.6 | 3.6 |

The results of these experiments prove that the effect of retarded rancidity and resistance to oxidation continues for weeks and months upon standing under usual conditions of storage and shipping.

EXAMPLE 11

A sample of cottonseed oil was divided into three parts:

I. Control.
II. Heated to 400° F., cooled down to 300° F. and added 0.1% alcohol insoluble phosphatide.

III. Heated to 300° F. then added 0.1% alcohol insoluble phosphatide.

After five days the peroxide values were:

I. 5.2
II. 1.7
III. 4.8

As can be seen from this experiment a temperature of only 300° F. was insufficient to bring about the desired result.

EXAMPLE 12

A sample of unheated cottonseed oil was compared with a sample of cottonseed oil which had been heated to 120° C. There was no difference in the original peroxide values which were 1.8. After five days the untreated oil had a peroxide value of 4.9 while the oil heated to 120° C. had a peroxide value of 5.4.

The heating of oil to only 120° C. had therefore no influence on the stability and the peroxide values except that it increased the development of rancidity.

EXAMPLE 13

A sample of untreated cottonseed oil (I) was compared with a sample containing 0.1% commercial lecithin (II) and a sample of the same oil heated to 400° F. and 0.1% commercial soybean lecithin added after cooling down to 300° F. The original peroxide values were:

I. 3.1
II. 3.1
III. 0.6

After thirteen days standing at room temperature the peroxide values were:

I. 5.8
II. 5.0
III. 1.2

After nineteen days:

I. 8.2
II. 6.8
III. 1.8

Although so far numerous research investigations have failed to explain completely the mode of action of anti-oxidants, several recent reports may throw some light on these complicated processes. As the temperature necessary for my process is relatively high the decomposition of lipoxidases as a reason for the effect can be ruled out.

It is thought that the anti-oxidant effect may involve a synergistic effect between two substances, an acidic factor such as in this case, cephalin and one of the so-called inhibitols which are of the type of tocopherol or vitamin D and present in nearly all natural fats and oils. As C. Golumbic pointed out at the Detroit meeting of the American Chemical Society in Detroit (September, 1940) some of the oxidation products of tocopherol are even more potent anti-oxidants. Also it was reported by the same investigator at the meeting of the American Chemical Society in April, 1942 that the inhibitols remove the peroxides while they themselves are rapidly destroyed by peroxides.

This effect is due to the type of compounds formed by tocopherol and its oxidation products, these compounds being hydroquinones having a strong reducing effect.

In 1937 Fernholz observed that heating of tocopherols resulted in the formation of durohydroquinone (J. Am. Chem. Soc. 59, p. 1154, 1937).

Other investigations recently published refer to other oxidation products of the quinone type formed from tocopherol as for instance tocopherylquinone (Olcott & Mattill, Chem. Reviews 29, 257, 1941; C. Golumbic & H. A. Mattill, J. Biol. Chem. 135, 534, 1940 Swift, Rose and Jamieson, Oil & Soap XIX, 176, 1942). Those tocopheryl quinones and hydroquinones are not effective by themselves but very effective in the presence of cephalin or other organic or inorganic phosphoric acids. It seems that under the influence of these acids a cyclisation takes place and tocoquinone is reformed which is also reduced to tocohydroquinone. The system Tocoquinone-Tocohydroquinone is only stable in the presence of a phosphoric acid radical, as in cephalin.

According to these reports these compounds or rather the stability of these compounds are dependent on the peroxide value in the treated oil and their quantity diminishes with increasing peroxide value and vice versa. Thus when a certain peroxide value is reached the inhibitols disappear and rancidity and rapid development of the peroxides occur. Once the inhibitols are consumed the peroxide formation proceeds about at the same rate as in the untreated oil and it is, therefore, essential to postpone this moment as far as possible.

There is little doubt that something like the reactions described above inheres in my process. Whether the peroxides are destroyed or neutralized in this or that way is hard to say, but also is not important. It may be that during the heating durohydroquinone is formed as described by Fernholz, or tocopheryl quinones may be formed during the initial stages of rancidity as described by Olcott, Mattill and Golumbic, which are reformed to tocopherolhydroquinones according to the same authors. This process is a cyclisation reaction with consequent loss of water and may well be performed by heat as many other similar processes. And as C. Golumbic recently showed (Oil & Soap XIX, 181) the resulting quinonehydroquinone system must be stabilized by cephalin. Apparently this must be done soon or otherwise further oxidation products will be formed which cannot then be made effective by cephalin.

Thus further experimental work has produced an explanation of the mechanism of the process I disclosed in my original application Serial No. 292,837, filed August 31, 1939, relating to the stabilizing effect of the phosphatides on the system which apparently constitutes the antioxidant. The observations of Swift, Rose and Jamieson and those of C. Golumbic as quoted above that the oxidation products of tocopherol as tocopherylquinone were inactive but activated by cephalin proves that my observation was correct that heating the oils without adding phosphatide is not effective. The hydroquinone formed may well break down the peroxides, but if the system quinone-hydroquinone is not stabilized, there is only a very short-lived effect or no effect at all.

As pointed out, the reaction in the oils which I am claiming does not take place at temperatures below 150° C. although it would ordinarily be expected that the oxidation of the fats would be progressively accelerated at higher temperatures. It could not have been foreseen, therefore, that heating the fats to higher temperatures as indicated would result in just the opposite result. So far I have not observed such an effect in any fat or oil below 300° F. and mostly the optimal effect is obtained at about 410° F. Nevertheless new findings may correct this position and perhaps heating under diminished pressure will also show results at a lower temperature.

Although I do not want to be bound by any theoretical explanation, the new experimental results recently reported as quoted above are a strong confirmation for my findings. As the presence of peroxides will destroy the inhibitols and the peroxide value is parallel to the development of rancidity (see also the report by Swift, Rose and Jamieson) the postponement of the development of peroxides is essential. However, the same reports confirm also my findings that the effect of adding the phosphatide is not merely additive, but that some coaction takes place to give an improved result.

Interesting in this connection is the comparison between Examples 10 and 13. In Example 10 the original peroxide value of 1.8 is very low, the sample of oil used one which had been just refined and deodorized. It must be assumed that antioxidant factors like tocopherols are still present to a certain extent. The effect of my treatment is still marked and the development of the critical peroxide value is more postponed in sample IV than in all other controls.

However, in Example 13 the synergistic effect of added lecithin and the heat treatment is much more marked. Referring again to the report of Swift, Rose and Jamieson and others as quoted above this is understandable. The peroxide values and consequently the development of rancidity are not in a quantitative relation to the anti-oxidants. As pointed out in these reports, however, increased amounts of anti-oxidants would not increase correspondingly the antioxidant effect.

The relatively high peroxide value in Example 13 indicates that most of the natural anti-oxidants must have been destroyed already although the oil showed no sign of organoleptic rancidity. Therefore, the added phosphatide found nothing or little to react with while the heat treatment apparently restored the minimum concentration of those natural anti-oxidants with which the phosphatide could react.

That the accumulation of new peroxides will destroy those anti-oxidants is probably one of the reasons for my observation that the phosphatide must be added as the oil cools or immediately after the heating to obtain the maximum effect.

As I have said before, the observed effect starts at about 150° C. or 300° F. but the effect is increased in most oils up to an optimum at about 410° F. No improvement has been seen over a temperature of about 410° to 420° F. under normal pressure and no improvement under 300° F. under normal pressure. There is no improvement in prolonged heating and it seems sufficient to heat the oils up to this temperature and have them cooled down immediately.

The reports by Olcott and Mattill and others as quoted above have proved my original observations correct. I cannot say that inhibitols are formed in the oils when heated but there is every evidence that some oxidation product of tocopherol or related substances is formed which when stabilized immediately by means of soybean phosphatides, forms a powerful anti-oxidant system. They are apparently different from the inhibitols, since it is not necessary to isolate the substance or concentrate it or free it from sterols and it is also effective for both animal and vegetable fats. The inhibitols were ineffective when added to the oils from which they were obtained.

The expression "fat or oil" is to be understood to include all glyceryl esters of fatty acids whether solid or liquid at atmospheric temperature.

I claim:
1. The method of stabilizing cottonseed oil against oxidation which comprises heating the oil to a temperature of about 400° F. and adding up to 1% of phosphatide to the oil at a temperature not exceeding 300° F. substantially immediately after the cooling.

2. The process of stabilizing triglycerides selected from the class consisting of fats and oils which comprises heating the same to a temperature of from about 300° F. to 420° F., and incorporating up to 1% of phosphatide at a temperature not exceeding 300° F. substantially immediately after cooling the oil.

ALBERT SCHARF.

REFERENCES CITED

The following references are of record in the file of this patent:

UNITED STATES PATENTS

| Number | Name | Date |
|---|---|---|
| 1,831,728 | Working | Nov. 10, 1931 |
| 2,007,108 | Bresnick | July 2, 1935 |
| 2,078,428 | Thurman | Apr. 27, 1937 |
| 1,982,186 | Working | Nov. 27, 1934 |
| 2,273,062 | Musher | Feb. 17, 1942 |